(12) United States Patent
Iwamatsu et al.

(10) Patent No.: US 9,427,717 B2
(45) Date of Patent: Aug. 30, 2016

(54) POWDER GRANULATION METHOD AND GRANULATION DEVICE

(75) Inventors: Hidetoshi Iwamatsu, Tokyo (JP);
Yoshiyuki Kato, Tokai-mura (JP);
Katsunobu Yoshimoto, Tokai-mura (JP); Tsutomu Kurita, Tokai-mura (JP);
Masahiro Suzuki, Tokai-mura (JP);
Katsunori Ishii, Tokai-mura (JP);
Yoshiyuki Kihara, Tokai-mura (JP)

(73) Assignee: NARA MACHINERY CO., LTD., Tokyo (JP)

( * ) Notice: Subject to any disclaimer, the term of this patent is extended or adjusted under 35 U.S.C. 154(b) by 913 days.

(21) Appl. No.: 13/637,042

(22) PCT Filed: Feb. 22, 2011

(86) PCT No.: PCT/JP2011/054431
§ 371 (c)(1),
(2), (4) Date: Nov. 5, 2012

(87) PCT Pub. No.: WO2011/118335
PCT Pub. Date: Sep. 29, 2011

(65) Prior Publication Data
US 2013/0055909 A1    Mar. 7, 2013

(30) Foreign Application Priority Data

Mar. 26, 2010  (JP) .................................. 2010-073611

(51) Int. Cl.
*B01J 2/14* (2006.01)
*B02C 17/14* (2006.01)
(Continued)

(52) U.S. Cl.
CPC .. *B01J 2/14* (2013.01); *B01J 2/24* (2013.01);
*B02C 17/10* (2013.01); *B02C 17/14* (2013.01)

(58) Field of Classification Search
CPC ............. B02C 2/00; B02C 2/10; B02C 2/24;
B01J 2/14; B01J 2/12
USPC .................................................. 241/176, 167
See application file for complete search history.

(56) References Cited

U.S. PATENT DOCUMENTS 2,100,860 A * 11/1937 Lobley ...................... B02C 4/08
221/135
2,309,970 A *  2/1943 McKinney ................. B01J 2/12
23/314

(Continued)

FOREIGN PATENT DOCUMENTS

JP        53-053585 A      5/1978
JP        61-5946 Y2       2/1986
(Continued)

OTHER PUBLICATIONS

International Search Report of the International Searching Authority mailed May 24, 2011 for the corresponding international application No. PCT/JP2011/054431 (with English translation).

*Primary Examiner* — Faye Francis
(74) *Attorney, Agent, or Firm* — Posz Law Group, PLC

(57) ABSTRACT

A powder granulation method affords greater operation efficiency and working efficiency and enhanced product recovery rate by preventing powder from being adhered to a container inner wall while suppressing variability in particle size of product to the utmost. A plurality of scrapers are disposed so as to abut or come close to the inner face of a bottomed cylindrical container that accommodates powder so that the powder in the container is granulated by causing an inner bottom surface of the container to rotate on a horizontal plane.

11 Claims, 6 Drawing Sheets

(51) Int. Cl.
   *B02C 17/10*   (2006.01)
   *B01J 2/24*   (2006.01)

(56) References Cited

U.S. PATENT DOCUMENTS

| | | | | |
|---|---|---|---|---|
| 2,463,556 A * | 3/1949 | Piper | ............................ | B02C 7/00 |
| | | | | 241/102 |
| 2,575,410 A * | 11/1951 | Davis | ........................ | B01F 7/145 |
| | | | | 241/166 |
| 2,661,160 A * | 12/1953 | Keiper | ..................... | B02C 13/282 |
| | | | | 241/112 |
| 2,711,964 A * | 6/1955 | Wiemer | ..................... | A23G 1/042 |
| | | | | 241/101.6 |
| 3,250,321 A * | 5/1966 | Root | ......................... | B01F 15/065 |
| | | | | 165/94 |
| 3,335,456 A * | 8/1967 | Takeuchi | .................... | B01J 2/14 |
| | | | | 23/313 P |
| 3,408,169 A * | 10/1968 | Beaumont | .................. | B01J 2/14 |
| | | | | 23/302 A |
| 4,214,863 A * | 7/1980 | Nixon | ......................... | C03B 1/02 |
| | | | | 425/222 |
| 4,236,677 A * | 12/1980 | Lodige | ..................... | B02C 21/00 |
| | | | | 241/172 |
| 4,726,755 A * | 2/1988 | Holley | ......................... | B01J 2/14 |
| | | | | 425/222 |
| 4,881,887 A * | 11/1989 | Holley | ......................... | B01J 2/10 |
| | | | | 366/313 |
| 5,383,613 A * | 1/1995 | Sundquist | ............ | A47J 43/0705 |
| | | | | 241/166 |
| 6,042,034 A * | 3/2000 | Abledu | ..................... | A47J 19/04 |
| | | | | 241/166 |
| 2010/0127106 A1* | 5/2010 | Fornasier | ............ | B01F 7/00208 |
| | | | | 241/66 |
| 2010/0155516 A1* | 6/2010 | Naito | .......................... | B01J 2/12 |
| | | | | 241/65 |

FOREIGN PATENT DOCUMENTS

| | | |
|---|---|---|
| JP | 62-183539 U | 11/1987 |
| JP | 01-148733 U | 10/1989 |
| JP | 10-147420 A | 6/1998 |

\* cited by examiner

POWDER GRANULATION METHOD AND GRANULATION DEVICE

CROSS REFERENCE TO RELATED APPLICATIONS

This application is a U.S. national stage application of PCT/JP2011/054431 filed on Feb. 22, 2011, and claims priority to, and incorporates by reference, Japanese Patent Application No. 2010-073611 filed on Mar. 26, 2010.

TECHNICAL FIELD

The present invention relates to a powder granulation method and granulation device. More particularly, the present invention relates to a container rotation-type granulation method and granulation device.

BACKGROUND ART

Numerous types of powder granulation methods are known, for instance tumbling granulation methods, agitation granulation methods, extrusion granulation methods, compression granulation methods, fluidized-bed granulation methods, crushing granulation methods and the like.

Among the foregoing, agitation granulation method are methods wherein target granulated particles are obtained by imparting shearing, tumbling and compacting actions on a starting-material powder, by adding a liquid or binder to the starting-material powder and causing stirring blades of various shapes to rotate. For instance, Japanese Examined Utility Model Application Publication No. S61-5946 discloses such an agitation granulation method.

In that agitation granulation method, starting-material powders can be mixed precisely in a short time, and a product (granulated particles) comparatively heavy and of comparatively homogeneous particles size can be produced, even in case of a plurality of types of starting-material powder. Accordingly, the agitation granulation method is used for granulation of various kinds of starting-material powders, for instance, pharmaceuticals, food, pesticides, feeds, fertilizers, minerals and the like.

In the agitated-type mixing granulator disclosed in Japanese Examined Utility Model Application Publication No. S61-5946, however, strong compression forces and shear forces act on the powder as a result of the rotation of stirring blades that rotate at high speed, and also granulation is performed by relying on the adhesive force of a binder such as water, through addition of the binder to the powder. Accordingly, tight adhesion (fixing) occurs between a container inner face and the stirring blades.

Also, humidified powder is pressed against the wall faces of the container on account of the centrifugal force that is imparted by the stirring blades, and hence powder as well becomes adhered at those sites. Such adhesion was marked, in particular, in cases of granulation where a powder of large specific gravity or small particle size was used.

As a result, a stripping operation of the adhesion layer had to be performed halfway during operation; alternatively, the stripping operation of the adhesion layer had to be performed after discharge of the product (before charging of the next starting material). This was problematic on account of the associated poorer operation efficiency and working efficiency, and was likewise problematic on account of the associated lower recovery rate of the product, and variability in particle size of product.

DISCLOSURE OF THE INVENTION

In the light of the above considerations of the background art, it is an object of the present invention to provide a powder granulation method and granulation device that afford greater operation efficiency and working efficiency and enhanced product recovery rate, by suppressing adhesion of powder to a container inner wall, and wherein variability in particle size of product is suppressed to the utmost.

In order to attain the above goal, a first powder granulation method of the present invention includes: arranging a plurality of scrapers so as to abut or come close to an inner face of a bottomed cylindrical container that accommodates a powder; and granulating the powder in the container by causing an inner bottom surface of the container to rotate on a horizontal plane.

As used herein, the term "close to" denotes the greatest possible closeness but without complete abutment.

A second powder granulation method of the present invention is the first invention, wherein the powder is granulated in the container by causing the inner bottom surface of the container to rotate on (in or within) a horizontal plane, in a state where the scrapers are fixed.

A third powder granulation method of the present invention is the first invention, wherein the powder in the container is granulated by causing the inner bottom surface of the container to rotate on a horizontal plane while the scrapers are caused to move along the inner face of the container.

In the first to third powder granulation methods of the present invention, the container that holds the powder is caused to rotate, to granulate the powder thereby, and hence the concern of adhesion of the powder to the container inner face is lessened. Accordingly, there can be reduced a stripping operation of an adhesion layer, halfway during operation, or a stripping operation of the adhesion layer after discharge of the product (before a next charge of starting material); operation efficiency and working efficiency are enhanced, the recovery rate of product is enhanced, and particle size of product becomes more homogeneous.

Since a plurality of scrapers is used, moreover, the load from the powder layer acting on each scraper is reduced, and hence the durability of the scrapers can be increased. Increasing the number of scrapers has the effect of increasing the degree of mixing of the powder, and increasing turbulence. The granulation effect is accordingly enhanced.

A fourth powder granulation method of the present invention is any one of the first to third inventions, wherein the container is caused to rotate at an outer peripheral speed ranging from 1 to 5 m/sec.

In the powder granulation method according to the fourth invention, the container rotates at low speed, and hence the load of the device can be reduced, and the durability of the device increased.

In order to attain the above goal, a fifth powder granulation device of the present invention has a configuration wherein a plurality of scrapers is disposed so as to abut or come close to an inner bottom surface of a cylindrical container, such that the inner bottom surface rotates on a horizontal plane, and so as to abut or come close to an inner-side face that is contiguous to the inner bottom surface.

In the powder granulation device according to the fifth invention, the container that holds the powder is caused to rotate, to granulate the powder thereby. Therefore, this allows preventing growth of adhered product, and even when powder adheres to the inner face, allows scraping off the adhered product quickly. As a result, the recovery rate of granulated particles can be enhanced, and variability in the particle size of the product (granulated particles) can be suppressed.

The scrapers are disposed as a plurality thereof, and hence the load from the powder layer acting on each scraper is reduced, and the durability of the scrapers can be increased. Increasing the number of scrapers has the effect of increasing the degree of mixing of the powder, and increasing turbulence. The granulation effect is accordingly enhanced.

A sixth powder granulation device of the present invention is the fifth invention, wherein the scrapers are dividedly arranged so as to abut or come close to the entirety of the inner bottom surface and inner-side face with which the powder charged into the cylindrical container comes into contact.

In the powder granulation device according to the sixth invention, the scrapers come reliably into contact with the powder that is charged in the cylindrical container. Hence, all the powder experiences a granulation effect, and the recovery rate of the product is further enhanced.

A seventh powder granulation device of the present invention is the fifth invention, wherein the scrapers are dividedly arranged so as to abut or come close to each of the inner bottom surface, inner-side face and corner of both of these faces of the cylindrical container.

In the powder granulation device according to the seventh invention, the scrapers are disposed abutting the inner bottom surface, inner-side face and corner of both foregoing faces, of the cylindrical container. Therefore, powder at the corner can be scraped off and granulated reliably.

An eighth powder granulation device of the present invention is the fifth invention wherein the scrapers that are caused to abut or come close to the inner bottom surface of the cylindrical container, are dividedly arranged for an inner periphery and an outer periphery of the container.

In the powder granulation device according to the eighth invention, a scraper for the inner periphery causes powder that is present at a central portion of the cylindrical container (including powder that is caused to return to the inner peripheral portion by the other scrapers) to move actively towards the outer peripheral portion of high peripheral speed (of higher granulation effect), and a powder layer is formed at the outer peripheral portion. The granulation effect can be increased as a result.

A ninth powder granulation device of the present invention is the eighth invention, wherein a conical or substantially hemispherical bump portion is formed, at a central portion of the cylindrical container, in place of the scraper for the inner periphery.

In the powder granulation device according to the ninth invention, the powder that is present at a central portion of the cylindrical container (including powder that is caused to return to the inner peripheral portion by the scrapers) can be caused to move actively towards the outer peripheral portion of the cylindrical container, at which the granulation effect is exerted, with no scraper being disposed at the central portion of the cylindrical container. As a result, the number of arranged scrapers can be reduced, and the device can be simplified.

A tenth powder granulation device of the present invention is any one of the fifth to ninth inventions, wherein the scrapers are disposed in a state where the leading end thereof is tilted so as to face a rotation direction of the cylindrical container.

In the powder granulation device according to the tenth invention, the leading ends of the scrapers do not seize with the inner face of the cylindrical container, even when the former abuts the latter. This allows preventing, therefore, damage to both the members and to a driving means.

The powder in the cylindrical container is compressed against the inner face by the scrapers, and a compressed layer of starting-material powder is formed between both faces. However, a constant urging force applied to the scrapers is converted to a shear force that acts on the adhesion layer, and hence any powder adhesion layer that would form at the inner face of the cylindrical container is caused to flake off at once by virtue of the abovementioned shear force. The granulation effect can be further enhanced as a result.

An eleventh powder granulation device of the present invention is any one of the fifth to tenth inventions, wherein the scrapers are fixed to a machine frame or the like of the granulation device by way of rods.

In the powder granulation device according to the eleventh invention, the position and attitude of the scrapers can be easily modified through deformation of the rods.

A twelfth powder granulation device of the present invention is any one of the fifth to eleventh inventions, wherein the scrapers are caused to abut the inner face of the cylindrical container by the urging force of springs, or the scrapers are caused to move away from the inner face of the cylindrical container when a predetermined load or greater occurs in the scrapers.

In the powder granulation device according to the twelfth invention, the scrapers are caused to move away from the inner face of the cylindrical container, against the urging force of the springs, even when a predetermined load or greater acts on the scrapers, for instance due to granulated particles that is got jammed between the scrapers and the inner face of the cylindrical container. This allows lessening the concern of wear and damage to the scrapers.

A thirteenth powder granulation device of the present invention is any one of the fifth to twelfth inventions, wherein the scrapers are disposed equidistantly in a circumferential direction of the cylindrical container.

In the powder granulation device according to the thirteenth invention, the number of scrapers can be increased. As a result, the chances for powder to come into contact with the scrapers per unit time, i.e. the degree of mixing of the powder by the scrapers, can be increased, and the granulation time can be shortened.

In order to attain the above goal, a fourteenth powder granulation device of the present invention has a configuration wherein a plurality of scrapers are disposed, at a machine frame or the like, movably in radial direction of an inner bottom surface that rotates on a horizontal plane, and a vertical direction of an inner-side face that is smoothly contiguous to the inner bottom surface, of a cylindrical container, in such a manner that leading ends of the plurality of scrapers abut or come close to the inner bottom surface and the inner-side face of the cylindrical container.

In the powder granulation device according to the fourteenth invention, the scrapers are caused to move, and hence the surface area of contact between the scrapers and powder may be reduced. The load acting on the scrapers can be thus reduced, and the durability of the device can be enhanced.

A fifteenth powder granulation device of the present invention is the fourteenth invention, wherein the scrapers are disposed equidistantly in a circumferential direction of the cylindrical container.

In the powder granulation device according to the fifteenth invention, the number of scrapers can be increased. As a result, the chances for powder to come into contact with the scrapers per unit time, i.e. the degree of mixing of the powder by the scrapers, can be increased, and the granulation time can be shortened.

BRIEF DESCRIPTION OF THE DRAWINGS

FIG. 7 is a set of diagrams illustrating conceptually another embodiment of the granulation device for carrying out the powder granulation method according to the present invention, wherein FIG. 7(a) is a plan-view diagram, and FIG. 7(b) is a longitudinal cross-sectional diagram.

BEST MODE FOR CARRYING OUT THE INVENTION

Figure 1:
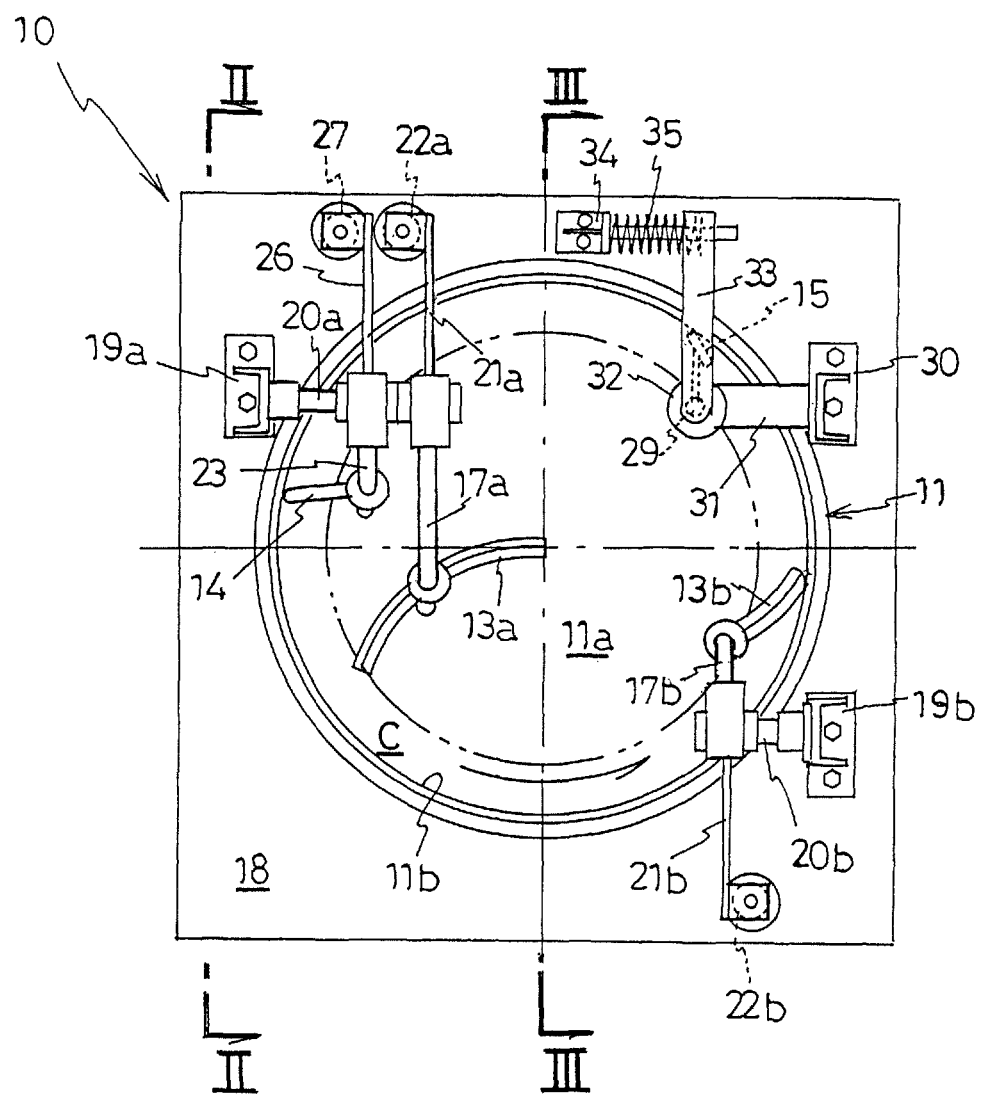
FIG. 1 is a plan-view diagram illustrating conceptually an embodiment of the granulation device for carrying out the powder granulation method according to the present invention.

The powder granulation method and granulation device according to the present invention are explained in detail below based on embodiments, with reference to accompanying drawings.

A powder granulation device 10 according to the present invention illustrated in FIG. 1 to FIG. 4 comprises: a cylindrical container 11 a bottom plate whereof rotates on a horizontal plane; a driving means 12 that causes the cylindrical container 11 to rotate, via a shaft 12a that is fixed to the rotation center axis of the cylindrical container 11; and a plurality of scrapers 13, 14, 15 that are disposed in such a way so as to come into contact with an inner bottom surface 11a of the cylindrical container 11, and with an inner-side face 11b that is smoothly contiguous with a peripheral edge portion of the aforementioned inner bottom surface.

Herein, the inner bottom surface 11a of the cylindrical container 11 is a circular flat plate, and the inner-side face 11b that is contiguous thereto is formed to be substantially perpendicular to the inner bottom surface 11a that rotates in (or within) a horizontal plane A reduced-diameter section, having the diameter thereof decreasing upwards, may be provided at the top of the inner-side face 11b. The top of the cylindrical container 11 may be in an open state, as in the figure. Alternatively, a below-described sealed structure may be resorted to wherein a lid is mounted to the machine frame.

The granulation device 10 has a configuration wherein the scrapers 13 are made up of two scrapers 13a, 13b that are band-like plate bodies shaped as arcs. The scrapers 13a, 13b are provided extending in the radial direction of the inner bottom surface 11a of the cylindrical container 11 in such a manner that an intermediate section (protruding section), in the longitudinal direction, projects in a direction that is opposite to the rotation direction of the cylindrical container 11.

In the scraper 13b disposed on the outer periphery side, in particular, the end portion of the scraper 13b that is positioned on the outer peripheral side is preferably disposed so as to be tilted facing further the rotation direction of the cylindrical container 11, in a so-called sweptwing state, than the end portion that is provided on the center side of the cylindrical container 11. That is because such a configuration affords a greater granulation effect.

The two scrapers 13a, 13b are disposed in such a manner that the scrapers 13a, 13b take up the entire rotation area of the inner bottom surface 11a of the cylindrical container 11.

The height of the scrapers 13a, 13b is smaller than the height of the powder layer at a time where a starting-material powder is charged into the cylindrical container 11, and varies depending on size of the device, and the height of the powder layer. The height of the scrapers 13a, 13b is set, for instance, to about 10 mm, in a case of a device having an inner volume of 65 liters.

The scrapers 13a, 13b are fixed to respective lower ends of rods 17a, 17b. The rods 17a, 17b extend upward, such that at the upper end portions of the rods 17a, 17b are bent, in right angles with respect to the scrapers 13a, 13b, in a direction opposite to the rotation direction of the cylindrical container 11. The upper ends of the rods 17a, 17b are pivotably supported on respective shafts 20a, 20b that are fixed, in the horizontal direction, to the top of struts 19a, 19b that are disposed on a machine frame 18. One respective end of each of extension pieces 21a, 21b is connected to a respective upper end of each rod 17a, 17b, and the other ends of the extension pieces 21a, 21b are urged upward by springs 22a, 22b that are disposed between the extension pieces 21a, 21b and the machine frame 18. Accordingly, the scrapers 13a, 13b are caused to abut the inner bottom surface 11a of the cylindrical container 11 by virtue of the urging force of the springs 22a, 22b.

The method for causing the scrapers 13a, 13b to abut the inner bottom surface 11a of the cylindrical container 11 is not limited to an urging force by the springs 22a, 22b. An appropriate method may be selected that involves, for instance, air-pressure control using an air cylinder, control of the torque of an electric motor, or relying on a predetermined load weight.

Figure 4:
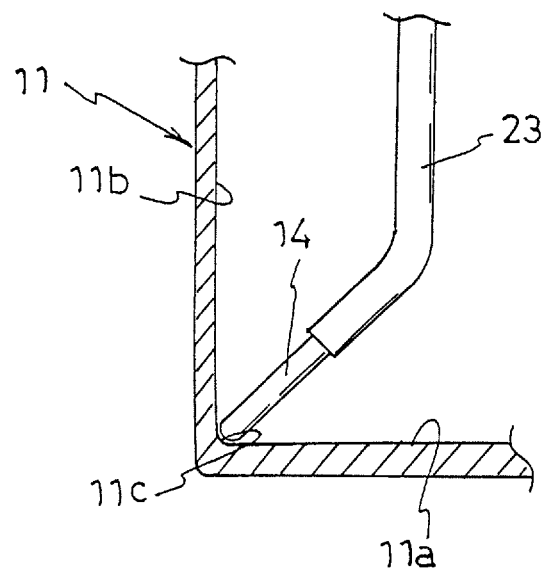
FIG. 4 is a conceptual cross-sectional diagram of a portion of FIG. 2 along line IV-IV.

The scraper 14 is configured as a narrow, elongated plate body, or an elongated solid cylindrical body. The leading end portion of the scraper 14 has a rounding of a curvature comparable to that of a corner 11c of the inner-side face 11b and the inner bottom surface 11a of the cylindrical container 11, as illustrated in FIG. 4. The leading end portion of the scraper 14 is obliquely disposed tilting from above, i.e. in the rotation direction and outer peripheral direction of the cylindrical container 11, in such a way so as to abut the corner 11c.

The scraper 14 is fixed to the lower end of a rod 23. The rod 23 is disposed extending upward, such that the upper end portion of the rod 23 is curved in right angles with respect to the scraper 14, in a direction opposite to the rotation direction of the cylindrical container 11. The upper end of the rod 23 is pivotably supported on the shaft 20a fixed to the strut 19a that is disposed on the machine frame 18. One end of an extension piece 26 is connected to the upper end of the rod 23, and the other is urged upward by a spring 27 that is fitted between the extension piece 26 and the machine frame 18. Therefore, the scraper 14 is caused to abut the corner 11c of the cylindrical container 11 by the urging force of the spring 27.

The scraper 15 is formed of a band-like plate body. The scraper 15 is disposed standing in the longitudinal direction thereof in such a way so as to abut the inner-side face 11b of the cylindrical container 11.

The scraper 15 is fixed to the lower end of a rod 29, by way of a stay 28. The rod 29 is disposed extending upward parallelly to the scraper 15. The upper end of the rod 29 is pivotably supported by a bearing 32 that is fixed, via a bracket 31, to a strut 30 that is disposed on the machine frame 18. One end of an extension piece 33 is connected to the upper end of the rod 29, and the other end is urged, in the horizontal direction, by a spring 35 that is fitted between the extension piece 33 and a spring receiving section 34 that is erected on the machine frame 18. Therefore, the scraper 15 is caused to abut the inner-side face 11b of the cylindrical container 11 by the urging force of the spring 35.

Alternative methods for causing the scraper 14 to abut the corner 11c of the cylindrical container 11 and alternative methods for causing the scraper 15 to abut the inner-side face 11b of the cylindrical container 11 are identical to those for causing the scrapers 13a, 13b to abut the inner bottom surface 11a of the cylindrical container 11.

Figure 5:
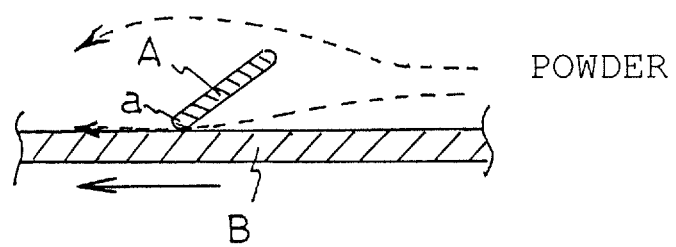
FIG. 5 is a conceptual cross-sectional diagram illustrating the attitude of a scraper of the present invention with respect to an abutting surface, and illustrating the flow of powder.

In the arrangement configuration of the scrapers A (13a, 13b, 15) that are used in the embodiment, as shown in FIG. 5, a leading end a thereof is preferably disposed, with respect to an abutting surface B (inner bottom surface 11a and inner-side face 11b) of the cylindrical container 11, in such a manner that the leading end a is tilted facing the advance direction of the abutting surface B (facing the rotation direction of the cylindrical container 11). As a result, the leading end a of the scrapers A does not seize with the abutting surface B, even when the leading end a of the scrapers A abuts the abutting surface B. This allows preventing, therefore, damage to both the members and to a driving means.

A method for granulating a powder using the powder granulation device 10 according to the present invention will be explained next.

A predetermined amount of a starting-material powder is charged into the cylindrical container 11 of the granulation device 10 configured as described above, and the cylindrical container 11 is caused to rotate by the above-described driving means (for instance, a motor) 12. In this case, the rotational speed of the cylindrical container 11 is arbitrary, but is ordinarily set to an outer peripheral speed ranging from 1 to 5 m/sec. This is a very slow speed compared to the outer peripheral speed of 10 to 15 m/sec in the above-described conventional agitated-type mixing granulator. As a result, the load in the granulation device 10 according to the present invention can be reduced, and the durability of the device can be enhanced.

A centrifugal force that is generated in response to the rotation of the cylindrical container 11 acts on the powder that is charged into the cylindrical container 11, and the powder is caused to move towards the peripheral edge portion of the cylindrical container 11. At this time, the closer the powder stands to the cylinder of the inner bottom surface 11a of the cylindrical container 11, the smaller the centrifugal force is that acts on the powder, and thus the powder tends to remain in place; the powder, however, is forcibly caused to move along a band-like plate body of the scraper 13a to a doughnut-shaped granulation region C on the outer side of a two-dot chain line.

Figure 6:
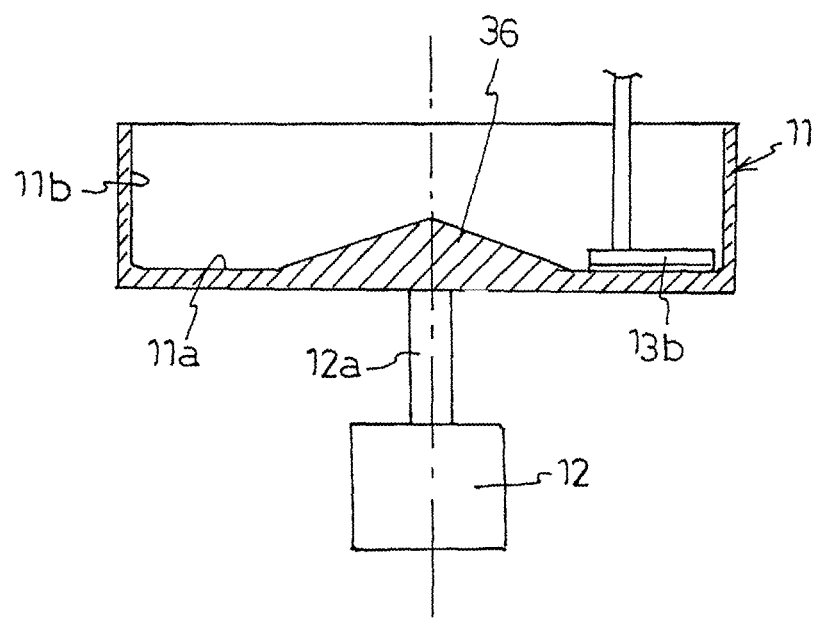
FIG. 6 is a conceptual cross-sectional diagram illustrating a variation of a container in the powder granulation device according to the present invention.

The means for causing the powder in the vicinity of the center of the cylindrical container 11 to move actively to the granulation region C is not limited to the abovementioned scraper 13a, and a conical or substantially hemispherical bump portion 36 may be formed instead at the central portion of the cylindrical container 11, as illustrated in FIG. 6.

The powder that moves towards the granulation region C varies depending on the centrifugal force that acts on the powder, and depending on the characteristics of the powder itself. The powder rises up the inner-side face 11b of the cylindrical container 11 and remains there, forming a powder layer the pile-up height whereof increases towards the peripheral edge portion. The powder layer moves rotationally together with the cylindrical container 11. The scrapers 13b, 15, 14, however, are disposed in such a way so as to abut the outer peripheral portion of the inner bottom surface 11a, as well as the inner-side face 11b and the corner 11c of both faces, of the cylindrical container 11. Therefore, the powder in the cylindrical container 11 comes necessarily into contact with any of the scrapers 13b, 15, 14 once in every rotation of the cylindrical container 11. The following actions are exerted on the powder as the latter comes into contact with the scraper 13b, 15, 14.

firstly, the scraper 13b causes part of the powder that is present at the granulation region C on the inner bottom surface 11a of the cylindrical container 11 to be pressed against the inner bottom surface 11a of the cylindrical container 11, but most of the powder rises over the place face of the scraper 13b, and is caused thereby to fly in the outer peripheral direction while being scraped up, to drop onto the powder layer at the outer peripheral portion. The scraper 14 causes part of the powder that is present at the corner 11c of the cylindrical container 11 to return in the centerward direction of the cylindrical container 11, and the rest of the powder twists up along the inner-side face 11 and drops onto the powder layer at the outer peripheral portion while performing a so-called a twist-rope motion. The scraper 15 causes part of the powder that is present in the vicinity of the inner-side face 11b of the cylindrical container 11 to be pressed against the inner-side face 11b of the cylindrical container 11, but most of the powder is scraped off inner-side face 11b, rises over the plate face of the scraper 15, twists up thereby in the centerward direction of the cylindrical container 11, and drops by being scattered widely onto the powder layer at the granulation region C while performing a twist-rope motion.

The powder in the cylindrical container 11 is vigorously agitated and mixed under the combined action, is imparted by the scrapers 13b, 14, 15, of shearing, tumbling and compaction identical to those of the stirring blades of a agitated-type mixing granulator once for every rotation of the cylindrical container 11.

The powder that is caused to return in the centerward direction (inward of the two-dot chain line circumference) of the cylindrical container 11 by the scrapers, is caused in turn to move forcibly towards the granulation region C by the scraper 13a, and undergoes the abovementioned combined action.

Next, a binder such as water or the like is sprayed, at a predetermined supply rate, for instance out of one fluid nozzle, not shown, onto the powder layer in the granulation region C. Thereupon, the binder adheres to the surface of the powder particles that are being agitated and mixed, and initial loose aggregates are formed through discontinuous liquid bridging around the contact points between particles. These aggregates are then gradually compacted, and voids between the particles become fewer as a result; the powder further adheres and bonds to the periphery of the aggregate, or alternatively, aggregates adhere and bond to each other, and large particles grow gradually.

Herein, the aggregates that comprise the binder are pressed against the inner face of the cylindrical container 11 by the scrapers A, and an adhesion layer of the starting-material powder (aggregates) forms between the leading end a of the scrapers A and the abutting surface B of the cylindrical container 11. However, a constant urging force applied to the scrapers A is converted to a shear force that acts on the adhesion layer, and hence any powder adhesion layer that would form at the inner face of the cylindrical container 11 is caused to flake off at once by virtue of the abovementioned shear force.

Figure 2:
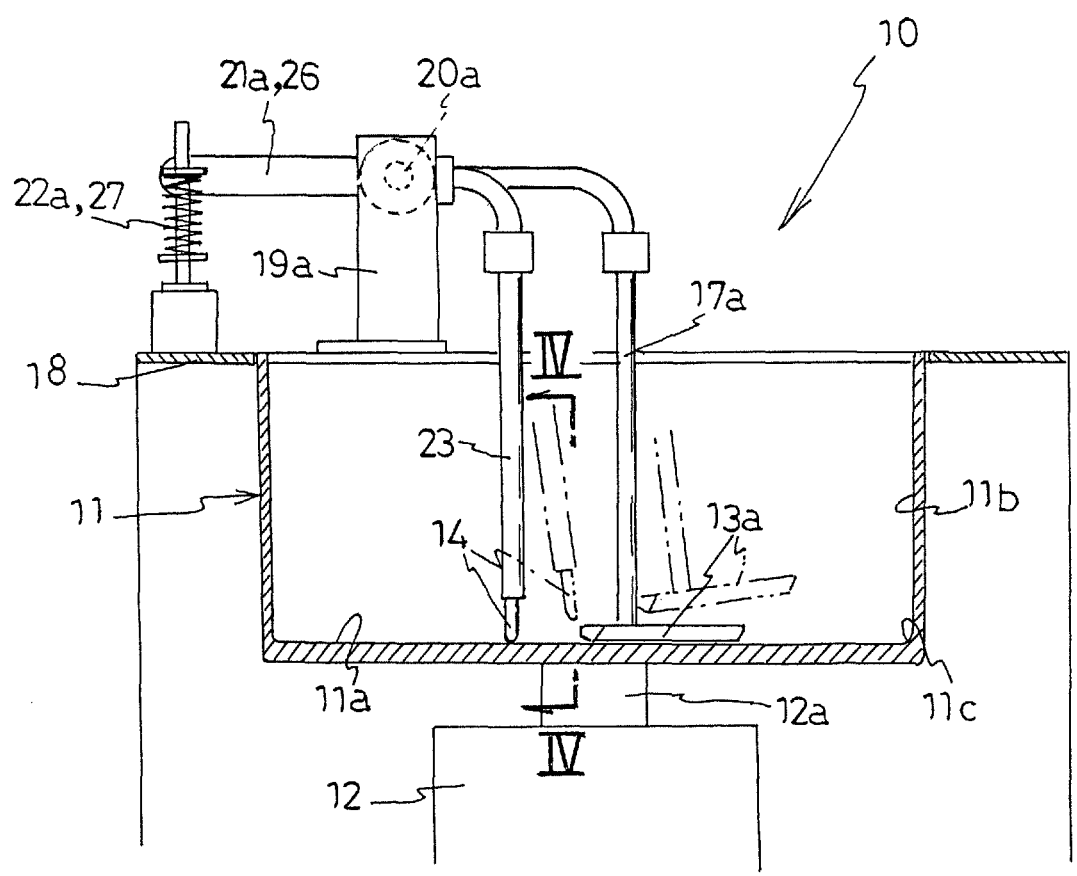
FIG. 2 is a conceptual cross-sectional diagram of a portion of FIG. 1 along line II-II.
Figure 3:
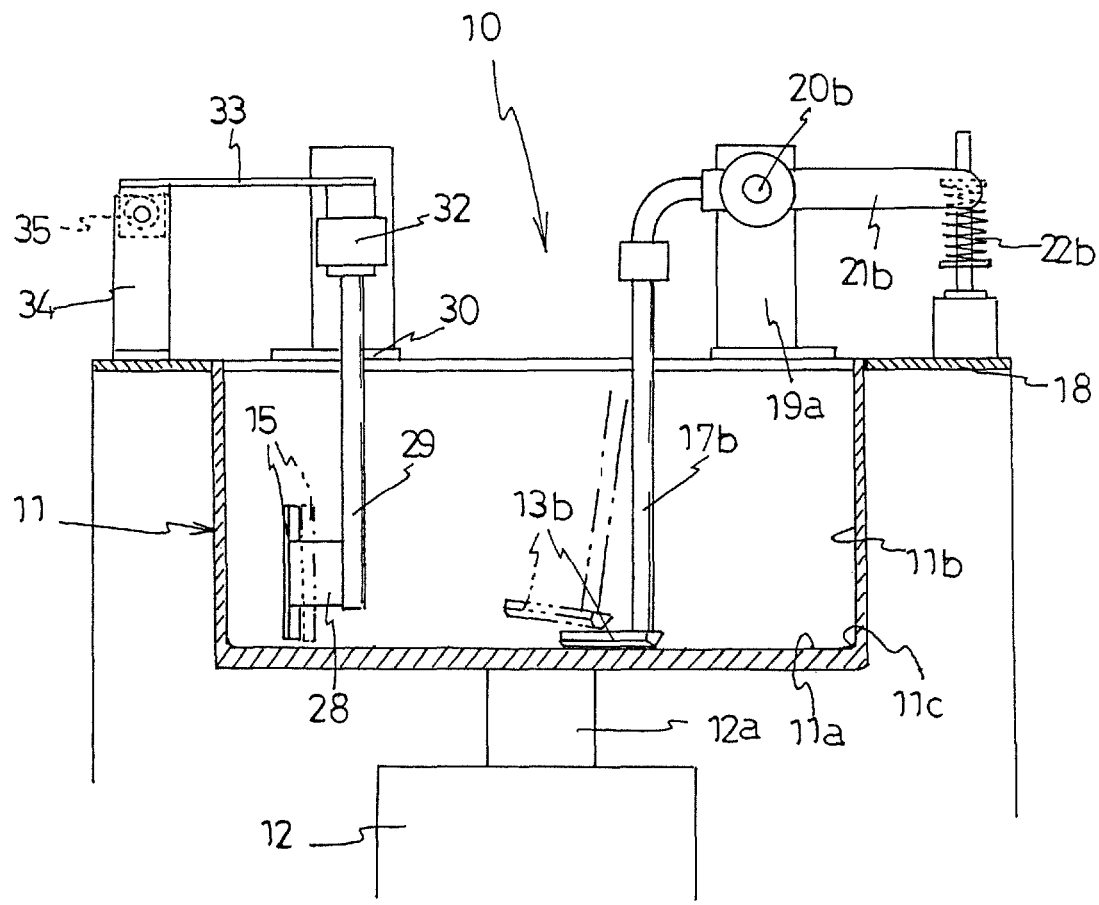
FIG. 3 is a conceptual cross-sectional diagram of a portion of FIG. 1 along line III-III.

The granulated particles and the like having grown large tend to be jammed between the leading end a of the scrapers A and the abutting surface B of the cylindrical container 11. As a result, the scrapers 13a, 13b, 14, 15 move away from the inner faces 11a, 11b, 11c, in the direction of the two-dot chain line, as illustrated in FIG. 2 and FIG. 3, against the urging force the respective springs 22a, 22b, 27, 35, even if a load equal to or greater than a predetermined load acts on the scrapers A. The concern of wear and damage of the scrapers 13a, 13b, 14, 15 is therefore lessened.

After supply of the binder is over, the cylindrical container 11 goes on rotating for a predetermined time; when the granulated particles have reached a desired particle size, the rotation of the cylindrical container 11 is discontinued, and the granulation process is terminated.

Figure 7:
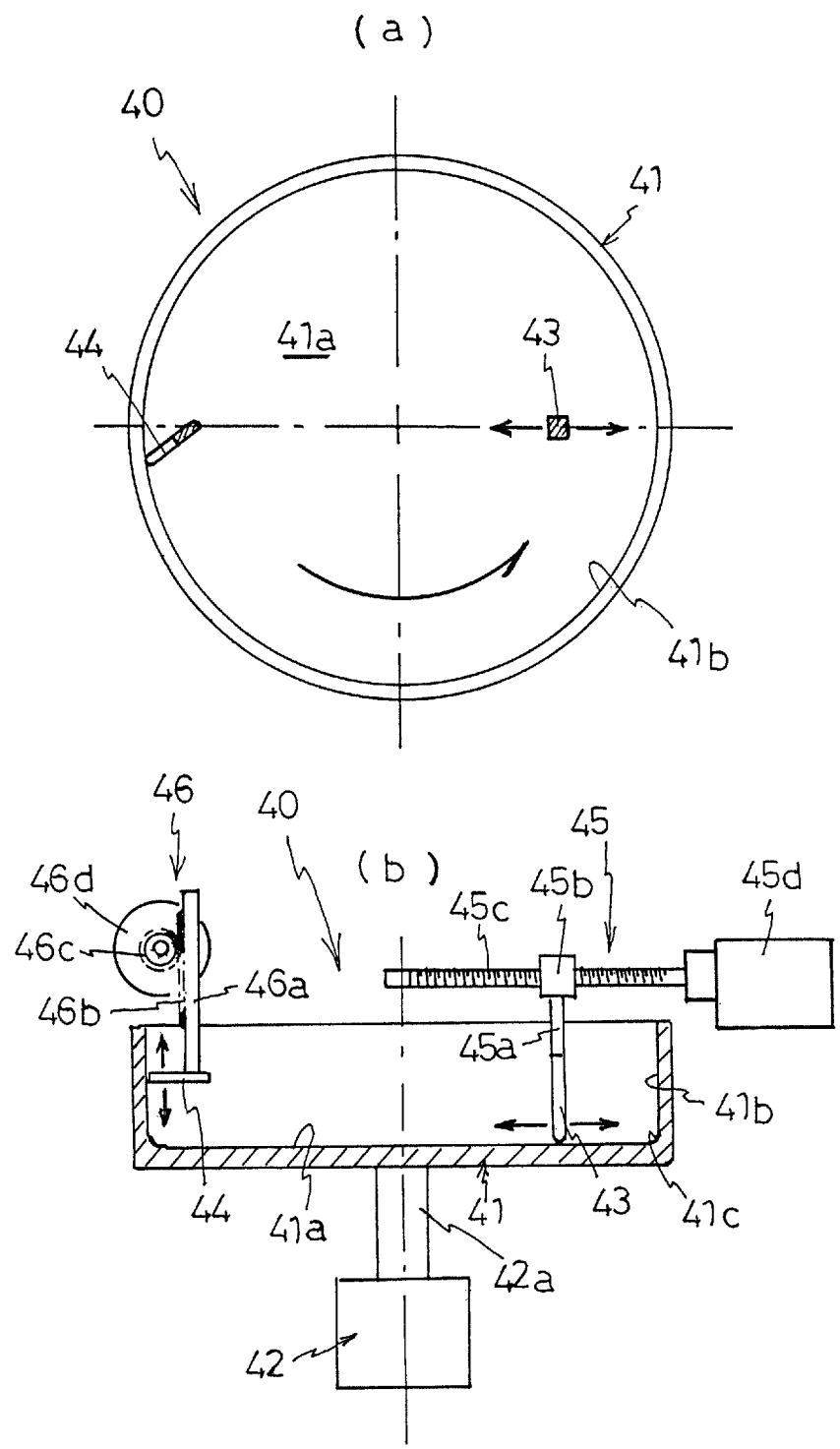

FIG. 7 is a diagram illustrating conceptually another embodiment of the granulation device for carrying out the powder granulation method according to the present invention.

The powder granulation device 40 according to the present invention comprises: a cylindrical container 41 a bottom plate whereof rotates on a horizontal plane; a driving means 42 that causes the cylindrical container 41 to rotate, by way of a shaft 42a that is fixed to the rotation center axis of the cylindrical container 41; a plurality of scrapers 43, 44 that are disposed in such a way so as to come into contact with an inner bottom surface 41a of the abovementioned cylindrical container 41, and with an inner-side face 41b that is smoothly contiguous with a peripheral edge portion of the aforementioned inner bottom surface; and motion means 45, 46 for moving the scrapers 43, 44.

The powder granulation device 40 is identical to the powder granulation device 10 of the above embodiment in that the inner bottom surface 41a of the abovementioned cylindrical container 41 is a circular flat plate, such that the inner-side face 41b that is contiguous thereto is formed to be substantially perpendicular to the inner bottom surface 41a; a reduced-diameter section, having the diameter thereof decreasing upwards, may be provided at the top of the inner-side face 41b; the top of the abovementioned cylindrical container 41 may be in an open state, as in the figure; and a below-described sealed structure may be resorted to wherein a lid is mounted to the machine frame.

In the granulation device 40, the scraper 43 is configured as a narrow, elongated plate body or rod. The leading end (lower end) of the scraper 43 comes into contact with the inner bottom surface 41a of the cylindrical container 41. The upper end of the scraper 43 is connected to a rod 45a. A nut 45b is disposed at the upper end of the rod 45a, such that a screw rod 45c disposed in the horizontal direction is screwed onto the nut 45b. A driving shaft of a motor 45d that is disposed on the machine frame or the like is connected to an end portion of the screw rod 45c.

In the scraper 43, when the screw rod 45c rotates in one direction, the nut 45b moves in one axial direction of the screw rod 45c, and in response thereto, the leading end moves in one radial direction of the inner bottom surface 41a of the cylindrical container 41, for instance in the centerward direction. The motor 45d is caused to reverse-rotate when the scraper 43 reaches the center of the inner bottom surface 41a of the cylindrical container 41. Thereupon, the nut 45b is caused to move in the other axial direction of the screw rod 45c, and in response thereto, the leading end of the scraper 43 moves in the other radial direction of the inner bottom surface 41a of the cylindrical container 41, for instance towards the peripheral edge.

The scraper 44 is configured as a narrow, elongated plate body or rod. The leading end (outer peripheral end) of the scraper 44 comes into contact with the inner-side face 41b of the cylindrical container 41. The scraper 44 is connected to an elongated member 46a of rectangular cross-sectional shape. A rack 46b is formed on a side face of the elongated member 46a, such that the rack 46b is movably supported on the machine frame. A pinion 46c meshes with the rack 46b of the elongated member 46a, such that the pinion 46c is connected to the driving shaft of the motor 46d that is disposed in, for instance, the machine frame.

In the scraper 44, when the pinion 46c is caused to rotate in one direction by the motor 46d, the elongated member 46a having the rack 46b formed thereon moves in one axial direction, and in response thereto, the scraper 44 moves in one vertical direction of the inner-side face 41b of the cylindrical container 41, for instance downwards. When the scraper 44 reaches the lower end (corner) of the inner-side face 41b of the cylindrical container 41, the motor 46d is caused to reverse-rotate, whereby the pinion 46c rotates in the other direction. Thereupon, the elongated member 46a having the rack 46b formed thereon moves in the other axial direction, and in response thereto, the scraper 44 moves in the other vertical direction of the inner-side face 41b of the cylindrical container 41, for instance upward.

Preferably, the arrangement configuration of the scrapers A (43, 44) as well is such that the leading end a is disposed, with respect to an abutting surface B (inner bottom surface and inner-side face) of the cylindrical container 41, in such a manner that the leading end a is tilted facing the advance direction of the abutting surface B (facing the rotation direction of the cylindrical container), as in FIG. 5 of the above embodiment. As a result, the leading end a of the scrapers A does not seize with the abutting surface B, even when the leading end a of the scrapers A abuts the abutting surface B. This allows preventing, therefore, damage to both the members and to a driving means.

A method for granulating a powder using the powder granulation device 40 according to the present invention will be explained next.

A predetermined amount of a starting-material powder is charged into the cylindrical container 41 of the granulation device 40 configured as described above, and the cylindrical container 41 is caused to rotate by the above-described driving means (for instance, a motor) 42. In this case, the rotational speed of the cylindrical container 41 is arbitrary, but is ordinarily set to an outer peripheral speed ranging from 1 to 5 m/sec.

A centrifugal force that is generated in response to the rotation of the cylindrical container 41 acts on the powder that is charged into the cylindrical container 41, and the powder moves towards the peripheral edge portion of the cylindrical container 41. The centrifugal force that acts on the powder is smaller in the vicinity of the center of the inner bottom surface 41a of the cylindrical container 41, and a powder layer stays and forms at that site. The closer the powder is to the inner-side face 41b, the greater the centrifugal force is that acts on the powder, and the powder rises along on the inner-side face 41b, and stays that site, so that a powder layer forms along the inner-side face 41b.

The motors 45d, 46d are then operated. As a result of the rotation of the motor 45d, the leading end of the scraper 43 reciprocates, at constant speed, in both radial directions (from the center to the corner 41c) of the inner bottom surface 41a, while coming into contact with the inner bottom surface 41a of the cylindrical container 41. As a result of the rotation of the motor 46d, the leading end of the scraper 44 reciprocates, at constant speed, in the vertical direction (from the corner 41c to the top face of the powder layer) of the inner-side face 41b while coming into contact with the inner-side face 41b of the cylindrical container 41.

In response to the motion of the scraper 43, part of the powder on the inner bottom surface 41a of the cylindrical container 41 is pressed against the inner bottom surface 41a of the cylindrical container 41 by the scraper 43, while another part is caused to return in the centerward direction of the cylindrical container 41. The rest of the powder twists upwards towards the peripheral edge of the cylindrical container 41, and drops thereafter on the powder layer in the circumferential direction of the cylindrical container 41. The scraper 44 causes part of the powder at the outer peripheral portion of the cylindrical container 41 to be pressed against the inner-side face 41b of the cylindrical container 41, and another part is pressed against the inner bottom surface 41a of the cylindrical container 41, and the rest of the powder twists up along the inner-side face 41b of the cylindrical container 41, and drops onto the powder at the outer peripheral portion of the cylindrical container 41 while performing a so-called a twist-rope motion. The powder in the cylindrical container 41 is vigorously agitated and mixed under the combined action, imparted by the scrapers 43, 44, of shearing, tumbling and compaction identical to those of the stirring blades of a agitated-type mixing granulator.

Next, a binder such as water or the like is sprayed, at a predetermined supply rate, for instance out of one fluid nozzle, not shown, onto the powder layer in the cylindrical container 41. Thereupon, the powder undergoes the same granulation effect as described above, and the powder grows gradually into large particles. Herein, the aggregates that include the binder are pressed against the inner face of the cylindrical container 41 by the scrapers A. An adhesion layer of the starting-material powder (aggregates) forms between the leading end a of the scrapers A and the abutting surface B of the cylindrical container 41. However, a constant urging force applied to the scrapers A is converted to a shear force that acts on the adhesion layer, and hence any powder adhesion layer that would form at the inner face of the cylindrical container 41 is caused to flake off at once by virtue of the abovementioned shear force.

The scrapers A move at all times in both radial directions and in the vertical direction of the inner-side face of the cylindrical container 41. Therefore, there is a low likelihood of jamming of granulated particles or the like, having grown to a large size, between the leading end a of the scrapers A and the abutting surface B of the cylindrical container 41; even where that the case, the scrapers A are elastic, and hence the leading end a moves away from the abutting surface B. The concern of wear and damage of the scrapers 43, 44 is accordingly lessened.

After supply of the binder is over, the cylindrical container 41 goes on rotating for a predetermined time, and the reciprocating motion of the scrapers 43, 44 continues. When the granulated particles have reached a desired particle size, the rotation of the cylindrical container 41, and the reciprocating motion of the scrapers 43, 44 are discontinued, and the granulation process is terminated.

Embodiments of the powder granulation method and granulation device according to the present invention have been explained above, but the present invention is not limited in any way to the above-described embodiments, and may accommodate, as a matter of course, all manner of variations and modifications that are encompassed within scope the technical idea of the present invention as set forth in the appended claims.

EXAMPLES

Examples of the present invention and comparative examples are explained below.

1. Test Device a. Device of the Present Invention

A device was configured by arranging four scrapers in a cylindrical container made of stainless steel and having an inner diameter of 600 mm. The arrangement position, shapes and so forth of the scrapers and the like are as conceptually illustrated in FIG. 1 to FIG. 5.

In the device, specifically, two scrapers were arranged so as to take up the entire rotation area of the inner bottom surface of the cylindrical container, one further scraper was disposed so as to abut the corner between the inner bottom surface and the inner-side face, and the remaining scraper was disposed so as to abut the inner-side face.

b. Conventional Device

A high-speed agitated-type mixing granulator (NMG-65L), manufactured by Nara Machinery Co., Ltd., was used.

This granulator has stirring blades, which rotate at high speed, attached to a cylindrical container made of stainless steel and having an inner diameter of 530 mm.

The stirring blades include three main blades, having a width of 90 mm and an angle of 15 degrees, that are provided equidistantly, in the circumferential direction, on a boss having a diameter of 170 mm. The diameter of the circumference of the outermost peripheral locus of the stirring blades is 526 mm, the clearance between the blade bottom portion and the container bottom face is 1 mm, and the clearance between the outermost peripheral locus of the stirring blades and the container side face is 2 mm.

2. Process Product

The process product was tungsten trioxide (Fl-$WO_3$, by A. L. M. T. Corp., having an average particle size ranging from 0.5 to 1.2 μm).

3. Binder

Water alone was used (added via one fluid spray nozzle).

4. Test Method

The test method was as follows.

a. Device of the Present Invention

1) A predetermined amount (5 kg/batch) of process product was charged into the container.

2) Water as a binder was sprayed while the container was caused to rotate.

The container revolutions were 50 rpm. The water supply rate was 150 ml/min, and the addition rate was set to 13%, 14% and 15% as given in Table 1.

3) Once water supply was over, as shown in Table 1 the container was caused to rotate at revolutions of 60 rpm, 75 rpm and 90 rpm, and respective process products were granulated.

The granulation time was set as the elapsed time after start of water supply, while checking the granulation state of the process products. The granulation time was as given in Table 1. The water supply time was about 5 minutes for an addition rate of 15%.

4) Once granulation was over, the (granulated) process product was recovered thereafter by sweeping with a brush, to yield a "granulated product", and the remaining product tightly adhered to the container was recovered by scraping, to yield an "adhesion product".

5) The "granulated product" and the "adhesion product" that were obtained were both dried in a thermostatic bath, to yield samples for evaluation.

Drying was performed at a temperature of 120° C. for 1 hour.

b. Conventional Device

1) A predetermined amount (5 kg/batch) of process product was charged into the container.

2) Water as a binder was sprayed while the stirring blades were caused to rotate.

The revolutions of the stirring blades were 100 rpm. The water supply rate was 150 ml/min, and the addition rate was set to 12%, 13% and 15% as given in Table 2.

3) Once water supply was over, the stirring blades were caused thereafter to rotate at revolutions of 100 rpm, 200 rpm and 300 rpm, as given in Table 2, and respective process products were granulated.

The granulation time was set as the elapsed time after start of water supply, while checking the granulation state of the process products. The granulation time was as given in Table 2. The water supply time was about 5 minutes for an addition rate of 15%.

4) Once granulation was over, the product was recovered by opening the discharge port and through rotation of the stirring blades at about 100 rpm, to yield a "granulated product"; and the remaining product tightly adhered to the container was recovered by scraping, to yield an "adhesion product".

5) The "granulated product" and the "adhesion product" that were obtained were both dried in a thermostatic bath, to yield samples for evaluation.

Drying was performed at a temperature of 120° C. for 1 hour.

5. Evaluation Method a. Granule Yield (Variability of Particle Size of Product)

The respective "granulated products" that were obtained were sifted using a Ro-Tap shaker (by Tanaka Kagaku Kikai). The fraction from 106 to 1000 μm was taken as the granule yield. The results are given jointly in Table 1 and Table 2.

The sample amount was set to about 100 g, and the sifting time to 10 minutes. No tapping was performed during sifting, in order to prevent the granulated product from collapsing by receiving a violent impact.

b. Recovery Rate

The recovery rate was calculated on the basis of the obtained respective "granulated product" and "adhesion product". The results are given jointly in Table 1 and Table 2.

The recovery rate was the weight proportion of "granulated product" with respect to "granulated product"+"adhesion product".

6. Test Results

TABLE 1

Device of the present invention

| No. | Container revolutions (rpm) | Water addition rate (%) | Process time (min) | Granule yield (%) | | | Recovery rate (%) |
| --- | --- | --- | --- | --- | --- | --- | --- |
| | | | | 106 μm under | 106 to 1000 μm | 1000 μm over | |
| Example 1 | 75 | 15 | 12 | 5.2 | 56.6 | 38.2 | 98.8 |
| Example 2 | 60 | 15 | 19 | 9.1 | 70.4 | 20.5 | 98.7 |
| Example 3 | 90 | 15 | 9 | 6.4 | 61.5 | 32.1 | 99.4 |
| Example 4 | 75 | 13 | 34 | 68.7 | 26.5 | 4.8 | 97.7 |
| Example 5 | 75 | 14 | 25 | 9.4 | 63.6 | 27.0 | 97.9 |

TABLE 2

Conventional device

| No. | Stirring blade revolutions (rpm) | Water addition rate (%) | Process time (min) | Granule yield (%) | | | Recovery rate (%) |
| --- | --- | --- | --- | --- | --- | --- | --- |
| | | | | 106 μm under | 106 to 1000 μm | 1000 μm over | |
| Comp. ex. 1 | 100 | 15 | 21 | 3.7 | 62.4 | 33.9 | 66 |
| Comp. ex. 2 | 200 | 15 | 11 | 6.3 | 7.4 | 86.3 | 59 |
| Comp. ex. 3 | 300 | 15 | 9 | 2.9 | 8.3 | 88.8 | 54 |
| Comp. ex. 4 | 100 | 13 | 19 | 1.5 | 69.7 | 28.8 | 46 |
| Comp. ex. 5 | 100 | 12 | 34 | 61.6 | 19.0 | 19.4 | 55 |

7. Evaluation a. Granule Yield (Variability of Particle Size of Product)

Where the device of the present invention was used, the granule yield having a target particle size range from 106 to 1000 µm was high, at 60 to 70% levels, in all tests, excluding the instance of 13% of the lowest water addition rate, even when changing the revolutions of the container and the water addition rate.

In a case where a conventional device was used, a granule yield at 60% levels could be obtained depending on the test conditions. However, the proportion of 1000 µm-over became extremely large, and so-called lumps of large size occurred in significant numbers, when the revolutions of the stirring blades were changed, even for a same water addition rate.

It is thus found that the advance of granulation is excessively fast, and hence particle size control difficult, in a case where a conventional device is used.

b. Recovery Rate

No tight adhesion of process product to the container was observed in any of the tests where the device of the present invention was used, and a "granulated particles" could be obtained at a high recovery rate of substantially 100%.

In the case where a conventional device was used, by contrast, there was tight adhesion to the corner portion between the bottom face and the side face of the container, with significant soft adhesion to the side face, and the recovery rate was very low at 40 to 60% levels (adhesion of ⅓ to ½ of the total charge amount).

From the above it follows that the device of the present invention elicits a distinctive effect over that of a conventional device.

INDUSTRIAL APPLICABILITY

The powder granulation method and granulation device according to the present invention explained above make for a reduced stripping operation of an adhesion layer, halfway during operation, or for a reduced stripping operation of the adhesion layer after discharge of the product (before a next charge of starting material), and afford enhanced operation efficiency and working efficiency, as well as enhanced recovery rate of the product and more homogeneous particle size of product. Accordingly, the present invention can be widely used in the granulation of starting-material powder of various types, for instance pharmaceuticals, food, pesticides, feeds, fertilizers, minerals and the like.

The invention claimed is:

1. A powder granulation device, comprising:
a cylindrical container configured to hold a starting-material powder, the cylindrical container having an inner bottom surface and an inner-side face contiguous with a peripheral edge portion of the inner bottom surface, the inner bottom surface of the cylindrical container being part of a circular flat plate and rotating in a horizontal plane; and
a plurality of scrapers disposed adjacent the inner bottom surface and the inner-side face of the cylindrical container, and the scrapers having a leading end facing a rotation direction of the cylindrical container;
the leading ends of the scrapers are tilted relative to the inner bottom surface of the cylindrical container and move one part of starting-material powder in the cylindrical container from a corner of the cylindrical container toward a center of the cylindrical container and another part of the starting-material powder in the cylindrical container in a twisting upward motion toward a peripheral edge of the cylindrical container and in a circumferential direction of the cylindrical container, during rotation of the cylindrical container; and
a nozzle supplying a binder into the cylindrical container.

2. The powder granulation device according to claim 1, wherein the scrapers are dividedly arranged adjacent an entirety of the inner bottom surface and inner-side face with which the powder charged into the cylindrical container comes into contact.

3. The powder granulation device according to claim 1, wherein the scrapers are dividedly arranged adjacent each of the inner bottom surface, inner-side face and corner of both of these faces of the cylindrical container.

4. The powder granulation device according to claim 1, wherein the scrapers abut the inner bottom surface of the cylindrical container and are arranged at an inner periphery and an outer periphery of the cylindrical container.

5. The powder granulation device according to claim 4, wherein a central portion of the inner bottom surface of the cylindrical container contains a conical or substantially hemispherical bump portion.

6. The powder granulation device according to claim 1, wherein the scrapers are fixed to a machine frame of the granulation device by way of rods.

7. The powder granulation device according to claim 1, further comprising springs urging the scrapers against the inner face of the cylindrical container and the scrapers move away from the inner face of the cylindrical container when a predetermined load or greater exceeds the force of the springs.

8. The powder granulation device according to claim 1, wherein the scrapers are disposed equidistantly in a circumferential direction of the cylindrical container.

9. A powder granulation device, comprising:
a machine frame;
a cylindrical container arranged within the machine frame, the cylindrical container having an inner bottom surface and inner-side face, the inner bottom surface of the cylindrical container being part of a circular flat plate and rotating in a horizontal plane, and the inner-side face extending in a vertical direction and being contiguous to the inner bottom surface of the cylindrical container;
a starting-material powder contained in the cylindrical container; and
a plurality of scrapers disposed on the machine frame and adjacent the inner bottom surface of the cylindrical container, the scrapers are movable in a radial direction of the inner bottom surface of the container and in the vertical direction of the inner-side face, and leading ends of the plurality of the scrapers abut the inner bottom surface and the inner-side face of the cylindrical container.

10. The powder granulation device according to claim 9, wherein the scrapers are disposed equidistantly in a circumferential direction of the cylindrical container.

11. The powder granulation device according to claim 9, wherein leading ends of the scrapers are tilted relative to the inner bottom surface of the cylindrical container and move one part of starting-material powder in the cylindrical container from a corner of the cylindrical container toward a center of the cylindrical container and another part of the starting-material powder in the cylindrical container in a twisting upward motion toward a peripheral edge of the cylindrical container and in a circumferential direction of the cylindrical container, during rotation of the cylindrical container.

* * * * *